(12) United States Patent
Grinder

(10) Patent No.: US 6,189,679 B1
(45) Date of Patent: Feb. 20, 2001

(54) LUMBER SPACING STICK CONVEYOR METER

(75) Inventor: Daniel A. Grinder, Salmon Arm (CA)

(73) Assignee: CAE Electronics Ltd., St. Laurent (CA)

( * ) Notice: Under 35 U.S.C. 154(b), the term of this patent shall be extended for 0 days.

(21) Appl. No.: 09/196,179

(22) Filed: Nov. 20, 1998

(51) Int. Cl.[7] .................................................. B65G 47/26
(52) U.S. Cl. ........................................................ 198/419.1
(58) Field of Search ............................. 198/419.1, 418.5, 198/459.7, 463.6, 443

(56) References Cited

U.S. PATENT DOCUMENTS

| | | | | |
|---|---|---|---|---|
| 1,837,607 | * | 12/1931 | Biggert ............................. | 198/419.1 |
| 2,497,586 | * | 2/1950 | Coons ............................... | 198/419.1 |
| 2,763,236 | * | 9/1956 | Cummings ........................ | 198/463.6 |
| 3,752,295 | * | 8/1973 | Hubbell et al. .................. | 198/459.7 |
| 4,120,393 | * | 10/1978 | Motooka et al. ................. | 198/459.7 |
| 4,298,118 | * | 11/1981 | Cottrell ............................. | 198/419.1 |
| 4,925,005 | * | 5/1990 | Keller ............................... | 198/463.6 |
| 5,259,723 | * | 11/1993 | Willis et al. ..................... | 198/463.6 |

* cited by examiner

*Primary Examiner*—Robert P. Olszewski
*Assistant Examiner*—Steven B. McAllister
(74) *Attorney, Agent, or Firm*—Antony C. Edwards

(57) ABSTRACT

The stick metering device of the present invention is mountable beneath a stick conveyor, and includes an upstream gate and a downstream gate. The downstream gate is generally parallel to and spaced apart a first distance from the upstream gate. The upstream gate cooperates with a first actuator for vertical actuation of the upstream gate between an upstream elevated position and an upstream lowered position. The downstream gate cooperates with a second actuator for vertical actuation of the downstream gate between a downstream elevated position and a downstream lowered position. When in the upstream and downstream elevated positions, respectively, the upstream and downstream gates intersect a stick flow path so as to interrupt a downstream flow of sticks along the stick flow path on the stick conveyor.

4 Claims, 7 Drawing Sheets

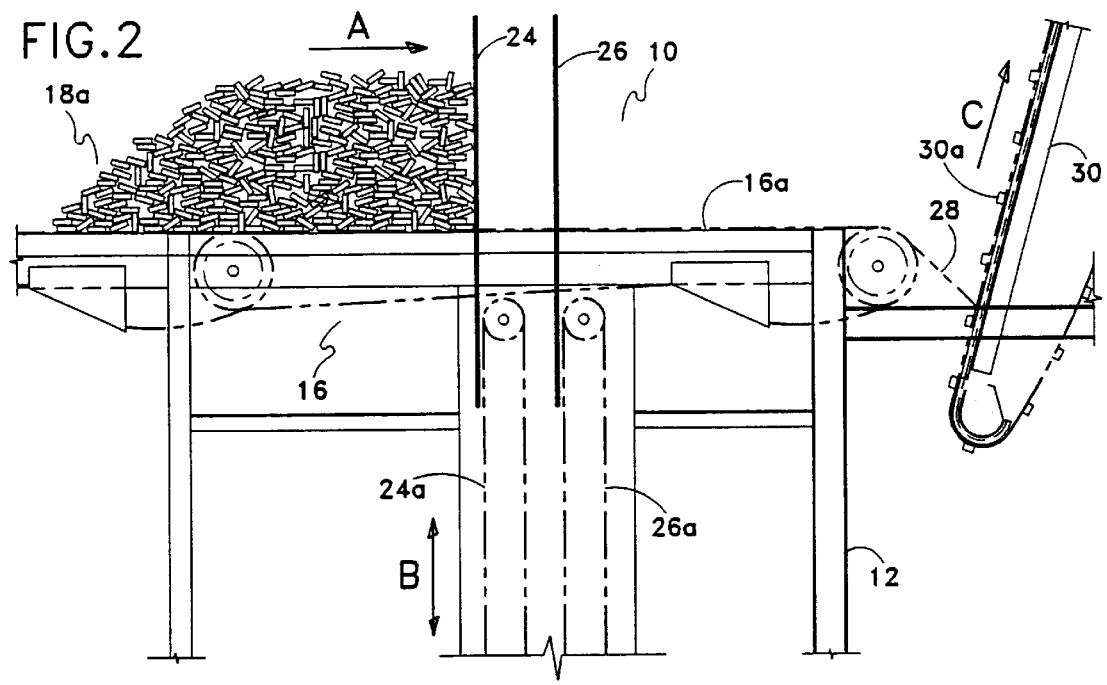
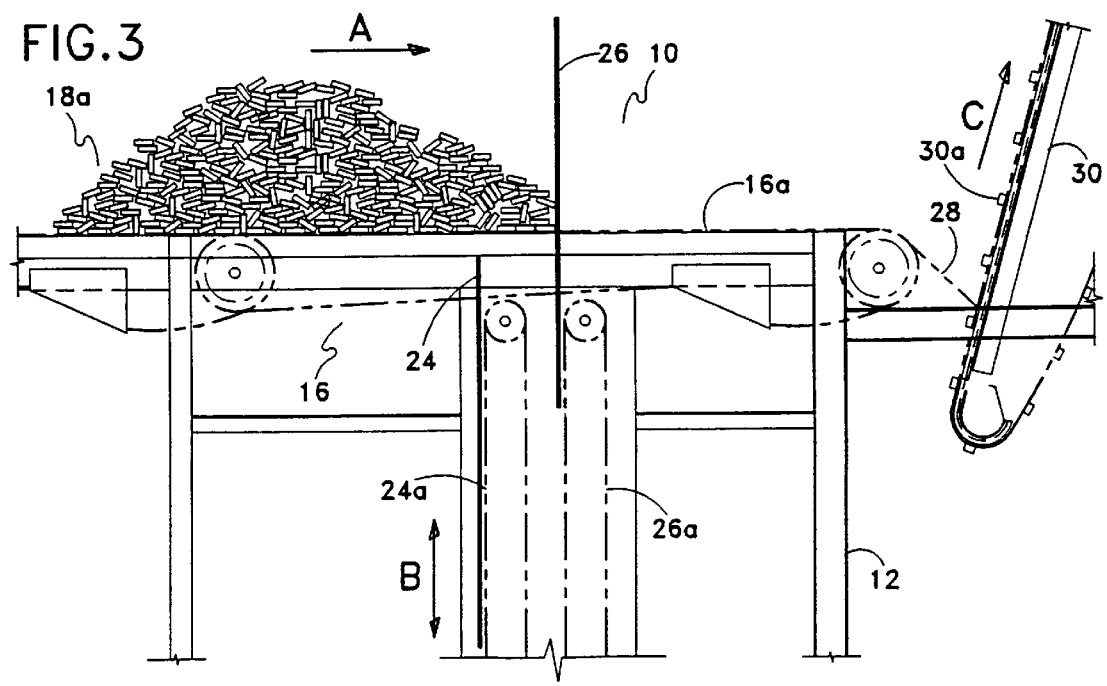

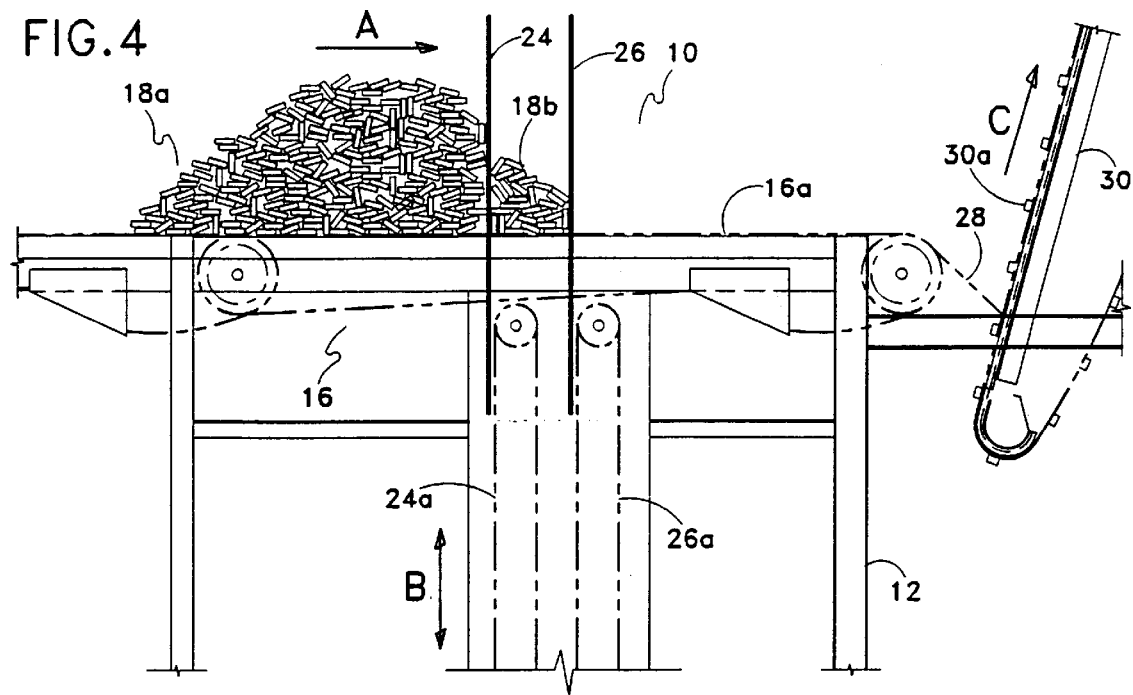
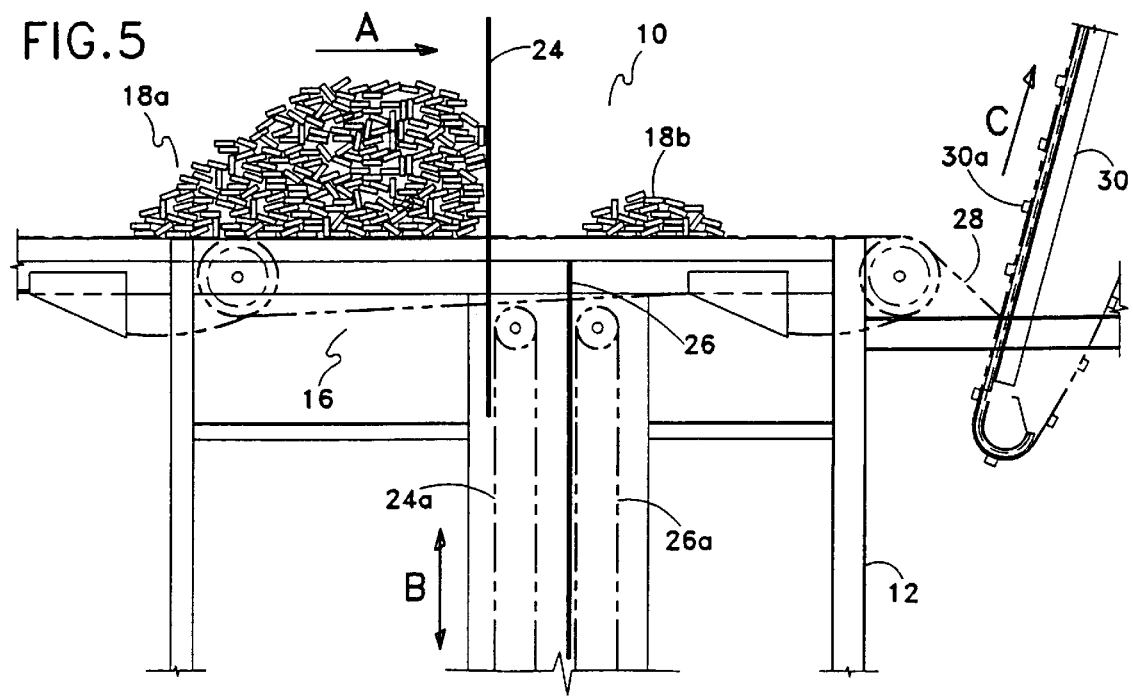

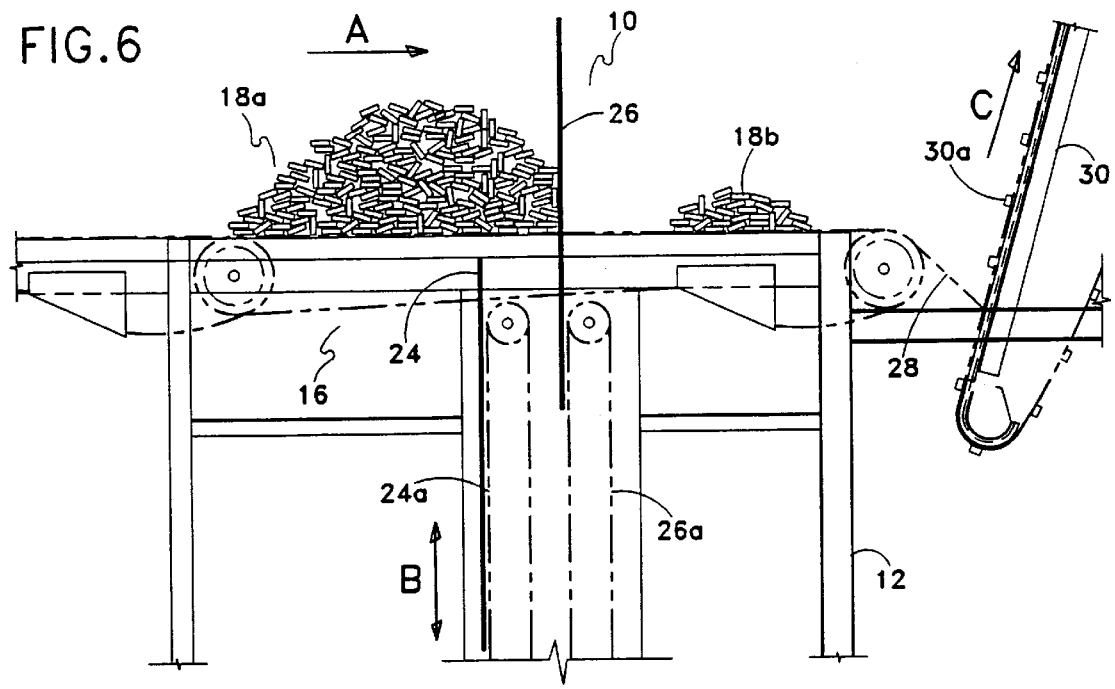
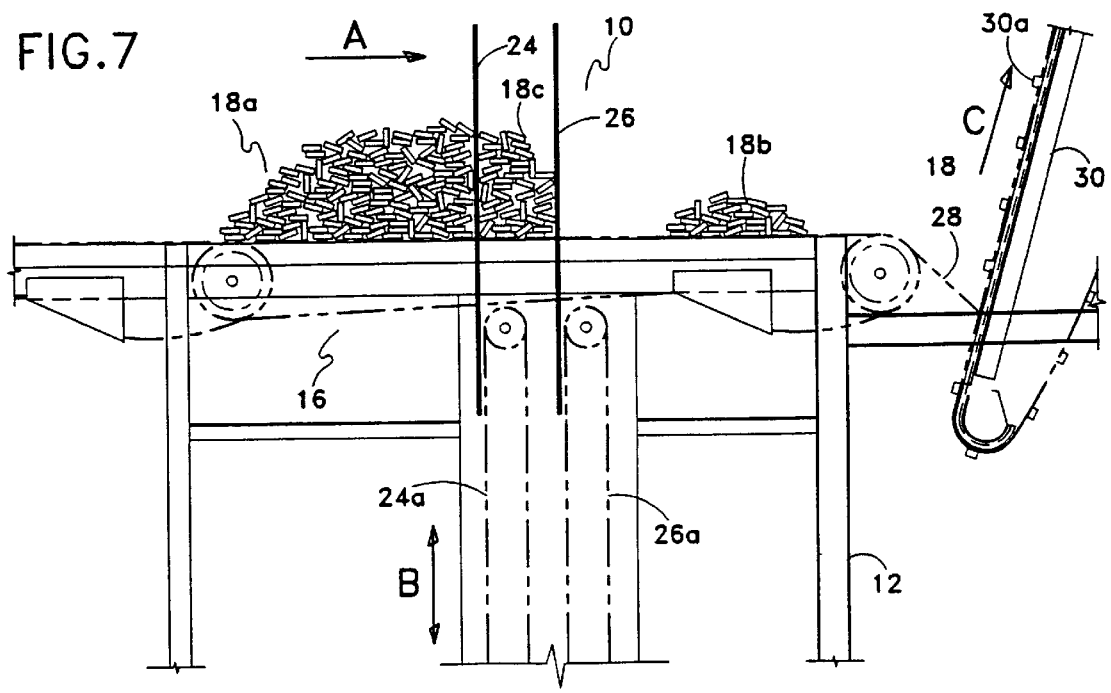

LUMBER SPACING STICK CONVEYOR METER

FIELD OF THE INVENTION

This invention relates to an apparatus for holding and conveying spacing sticks to a stick placer in a sawmill, and in particular relates to an apparatus capable of automatically metering spacing sticks on a conveyor, for uniform delivery to a stick allocator for allocating spacing sticks for subsequent delivery and placing between tiers in a lumber stack being formed by a stacker in a sawmill.

BACKGROUND OF THE INVENTION

Previously automatic stick conveyors incorporated a stick un-loading area. The sticks were un-loaded onto a chain conveyor by a transportable stick bunk. The stick bunk was typically placed by a forklift on to the top of a hoist raised above the stick conveyor. The hoist was then lowered and the sticks set down onto the chain conveyor. Once the bunk was lowered completely below the conveyor, the conveyor began to move the sticks to an unscrambler. The unscrambler separated the sticks into a mat of adjacent sticks lying on their sides. The mat was then translated to a stick allocator. The allocator separated and allocated the sticks for timed and sequenced delivery to an automatic stick placer.

In this form of prior art system, the sticks often arrived bunched up at the unscrambler and needed to be manually prodded and straightened for even delivery to the allocator by the stick unscrambler.

It is therefore an object of the present invention to produce a stick metering apparatus wherein the delivery of sticks is automatically controlled on the stick transfer for even delivery of sticks to the stick unscrambler.

It is another object of the invention to produce a stick transfer metering apparatus that can be retrofitted to existing stick transferring systems.

SUMMARY OF THE INVENTION

Sticks are loaded onto a chain conveyor by a transportable stick bunk. The stick bunk is placed on to the top of a scissor hoist which has been elevated between a parallel pair of chains comprising the upstream end of chain conveyor. The hoist is lowered to rest the sticks on the chain conveyor. The bunk is lowered completely below the stick conveyor to release the sticks free of the bunk uprights onto the stick conveyor.

A pair of rigid translatable stick gates, one upstream and one spaced and parallel downstream, are mounted below and between the pair of conveyor chains. The stick gates can be selectively elevated so as to extend into the flow path of the sticks so as to block flow of the sticks downstream on the conveyor. The gates may be retracted down out of the stick flow path. Alternating sequential extension and retraction of the two gates meters the flow downstream of the sticks bunched on the chain conveyor following removal from the stick bunk.

After the stick bunk has been fully retracted down releasing the sticks into a pile on top of the chain conveyor, the chain conveyor starts up momentarily moving or jogging for a short period the stick pile downstream towards and against the first stick meter gate in its elevated position. The first stick gate is elevated so as to assist in straightening any sticks that might have become skewed as the sticks spill from the bunks onto the conveyor. To begin metering the flow of sticks, the second, i.e. downstream, gate is raised.

The first stick gate is then lower, allowing the sticks which were bunched up against it to tumble down against the second gate. After a brief pause (approximately 2 seconds) the first gate is elevated pushing its way up through the shallow downstream portion of the pile of sticks, that is, up through the sticks which had tumbled down. Elevating the first gate gently lifts, separates, and straightens the sticks so that a shallow layer, bunch or bundle of sticks is contained between the two elevated gates, leaving a deeper layer, bunch, bundle or pile of sticks upstream of the first gate. After another brief pause (approximately 2 seconds) the second gate lowers to a position below the stick conveyor chains. The stick conveyor chains then jog forward downstream (approximately 2 seconds, equal to approximately 2 feet of travel) advancing the shallow layer of sticks toward the stick unscrambler, and causing the deeper pile of sticks upstream of the first gate to bunch or pile up against the first gate as they were at the beginning of the breakdown cycle.

Repeating this breakdown cycle produces a spaced apart series of shallow piles of sticks, spaced apart downstream of the second gate, effectively creating a continuous layer of shallow piled sticks on the stick conveyor chains. Because the sticks are retained between and against two elevated gates during a holding time pause in the breakdown cycle, the sticks in the resulting shallow layer are essentially parallel as they travel to the unscrambler.

A photo-eye may be located at the unscrambler trough at the bottom of the unscrambler to detect the presence or absence of sticks waiting to be unscrambled. If no sticks are detected, the two gates and chain conveyor are cycled through the breakdown cycle repetitively until sticks are detected in the unscrambler trough, at which time translation of the stick gates and the chain transfer is stopped. Each time the photo-eye in the unscrambler trough causes a monitoring processor to call for more sticks, the stick chain conveyor advances approximately 2 feet, depositing the corresponding volume of sticks from the shallow layer carried on the conveyor into the unscrambler trough. Because the shallow layer of sticks on the stick chain conveyor is controlled by the stick metering apparatus, the volume of sticks deposited into the unscrambler trough is consequently controlled, allowing the unscrambler to operate with an optimal amount of sticks in the unscrambler trough. As a result, the stick unscrambler operates at peak efficiency, delivering an adequate and continuous supply of sticks to downstream stick placing equipment. The unscrambler lifts and separates sticks from the unscrambler trough, and transfers the unscrambled sticks to the unscrambler outfeed to form a mat for allocation to the stick placer. The unscrambler stops and starts as required to maintain a constant supply of sticks at the allocator.

In summary, the stick metering device of the present invention is mountable beneath a stick conveyor, and includes an upstream gate and a downstream gate. The downstream gate is generally parallel to and spaced apart a first distance from the upstream gate. The upstream gate cooperates with a first actuator for vertical actuation of the upstream gate between an upstream elevated position and an upstream lowered position. The downstream gate cooperates with a second actuator for vertical actuation of the downstream gate between a downstream elevated position and a downstream lowered position. When in the upstream and downstream elevated positions, respectively, the upstream and downstream gates intersect a stick flow path so as to interrupt a downstream flow of sticks along the stick flow path on the stick conveyor. When in the upstream and downstream lowered positions, respectively, the upstream and downstream gates do not intersect the stick flow path so as not to interrupt the downstream flow of sticks along the stick flow path on the stick conveyor.

The upstream gate has an exposed vertical length which is exposed across the stick flow path when in the upstream elevated position. The exposed vertical length is sufficient to dam a pile of sticks loaded onto the stick conveyor from an upstream reservoir of sticks.

The first distance between the upstream and downstream gates is sufficient to allow segregation, between the upstream and downstream gates, of a leading portion of the pile of sticks.

The first and second actuators are selectively sequentially actuated by timing and actuating means. During a first breakdown cycle phase, the first actuator elevates the upstream gate into the upstream elevated position so as to accumulate the pile of sticks against the upstream gate. During a second breakdown cycle phase, the first actuator lowers the upstream gate into the upstream lowered position and the second actuator elevates the downstream gate into the downstream elevated position so as to release the leading portion of the pile of sticks from the remainder of the pile of sticks into the segregation space between the upstream and downstream gates. During a third breakdown phase cycle phase, the first actuator elevates the upstream gate into the upstream elevated position and the second actuator lowers the downstream gate into the downstream lowered position, so as to segregate the leading portion of the pile of sticks from the remainder of the pile of sticks.

Advantageously, the device further includes a stick conveyor controller for selective stepped advancing of the stick conveyor in a downstream direction. The stick conveyor controller cooperates with the timing and actuating means for stepped advancing in the downstream direction of the leading portion of the pile of sticks during the third breakdown cycle phase. The stick conveyor controller selectively stops the stepped advancing of the stick conveyor in the downstream direction during the second breakdown cycle phase.

In one aspect of the present invention, the first and second actuators are chains and the upstream and downstream gates are mounted, respectively, to the chains. It is understood however that this is not intended to be limiting, as other types of selectively operable actuators such as hydraulic cylinders, mechanically driven arms or linkages, or cams or the like might be employed within the scope of the invention.

In a further aspect, the upstream and downstream gates are parallel rigid plates, although this is not intended to be limiting as forks, screens or other forms of stick flow dams might be employed within the scope of the invention.

Further advantageously, the stick conveyor is a laterally spaced apart pair of longitudinal conveyors, laterally spaced so as to lie on opposite lateral sides of said upstream and downstream gates. The stick reservoir may be a stick bunk selectively elevatable between laterally spaced apart pair of longitudinal conveyors.

The invention provides other advantages which will be made clear in the description of the preferred embodiments.

BRIEF DESCRIPTION OF THE DRAWINGS

The invention will be better understood by reference to the accompanying drawings, wherein:

FIG. 2 is an enlarged sectional partially cut-away side elevation view of the apparatus of FIG. 1 showing the two metering gates in their elevated position at the commencement of the breakdown cycle.

FIG. 3 is the side elevation view of FIG. 2 showing the upstream stick gate in its lowered position.

FIG. 4 is the side elevation view of FIG. 2 showing the upstream stick gate returned to its elevated position segregating the downstream-most sticks.

FIG. 5 is the side elevation view of FIG. 2 showing the downstream stick gate in its lowered position and the segregated sticks translated downstream.

FIG. 6 is the side elevation view of FIG. 2 showing the upstream stick gate once again lowered.

FIG. 7 is the side elevation view of FIG. 2 showing the upstream stick gate once again elevated to segregate a second portion of sticks.

DETAILED DESCRIPTION OF THE PREFERRED EMBODIMENT

Figure 1:
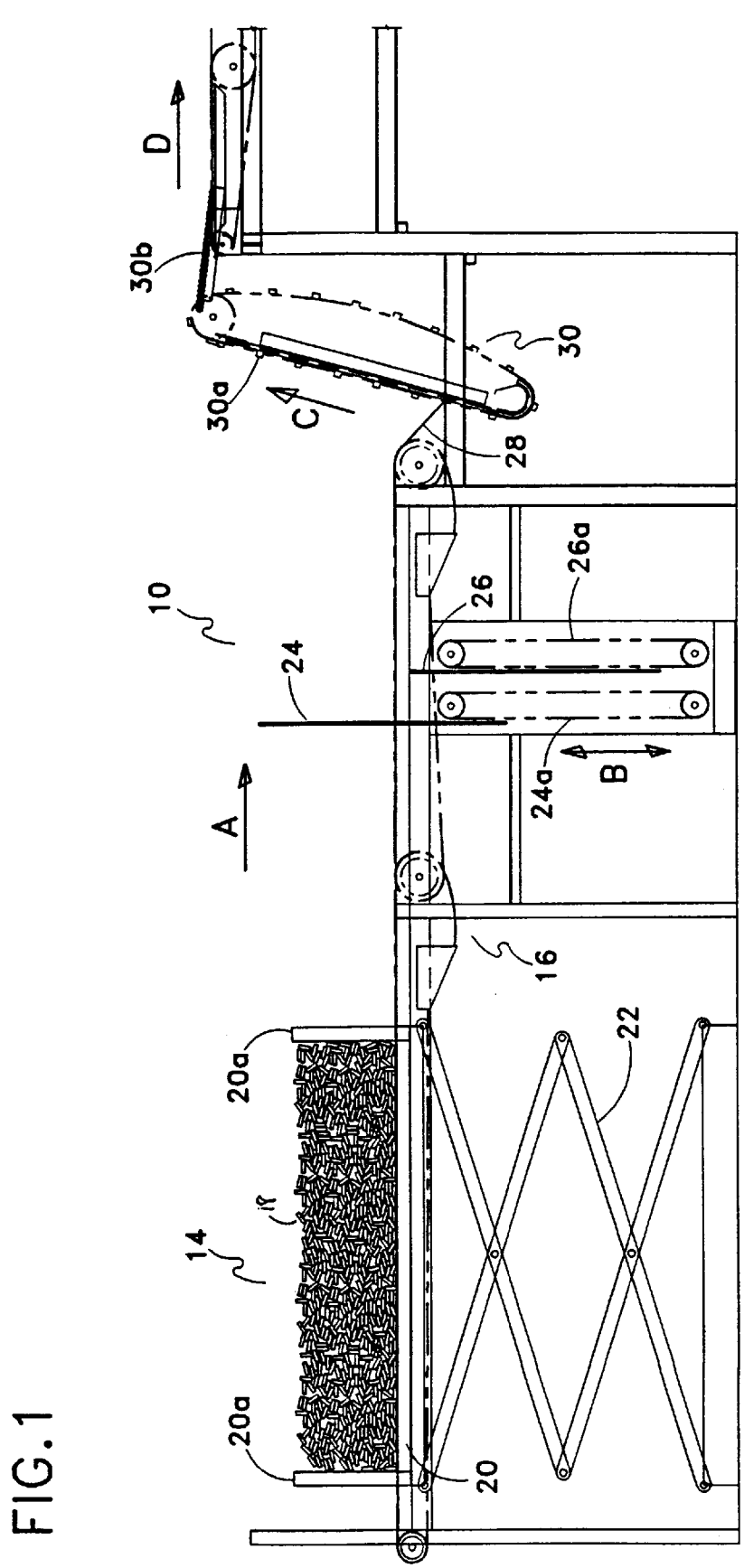
FIG. 1 is a side elevation view according to a preferred embodiment of the invention.

Referring to the drawing figures wherein similar characters of reference represent corresponding parts in each of several views, the apparatus is generally indicated by the reference numeral 10 and is best seen in FIGS. 1 & 6. The apparatus 10 includes a support frame constructed of various vertical and horizontal structural supports 12. Apparatus 10 is mounted adjacent to a stick placer allocator (not shown) upstream relative to the direction of flow of sticks.

In the preferred embodiment as is best seen in FIG. 1, the automatic stick delivery system consists first of a stick bunk receiving area 14. A chain conveyor 16 moves in direction A. It is understood that chain conveyor 16 may be a longitudinal series, or at least more than one, chain conveyor. Sticks 18 are loaded onto chain conveyor 16 by a transportable stick bunk 20. Sticks 18 are retained on stick bunk 20 between bunk uprights 20a. Stick bunk 20 is placed on to the top of a scissor hoist 22 which has been elevated up between a laterally spaced apart pair of chain conveyors 16a seen better in FIG. 10. Hoist 22 is lowered to thereby lower stick bunk 20. Sticks 18 protrude beyond the lateral edges of stick bunk 20 so that as the bunk is lowered sticks 18 are left resting on chain conveyor chains 16a. As stick bunk 20 is lowered completely below chain conveyors 16a, sticks 18 are released by bunk uprights 20a onto chain conveyor 16. Chain conveyor 16 begins to translate sticks 18 toward stick meter gates 24 and 26.

Figure 10:
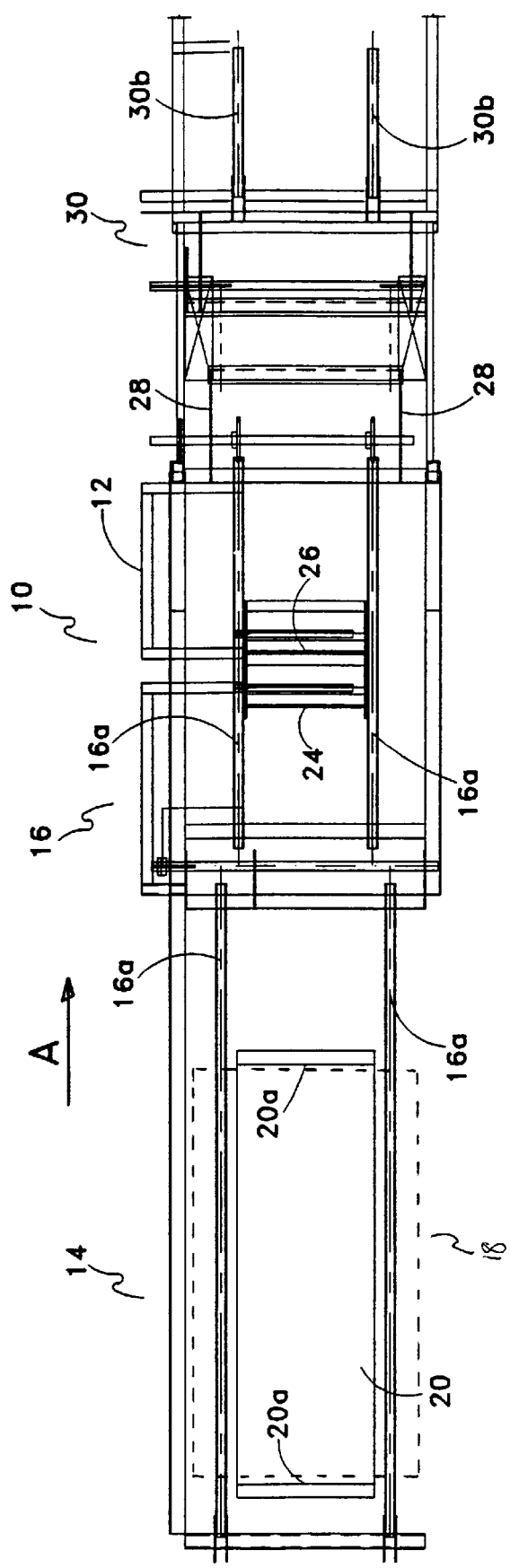
FIG. 10 is the plan view according to the preferred embodiment of FIG. 1.
Figure 11:
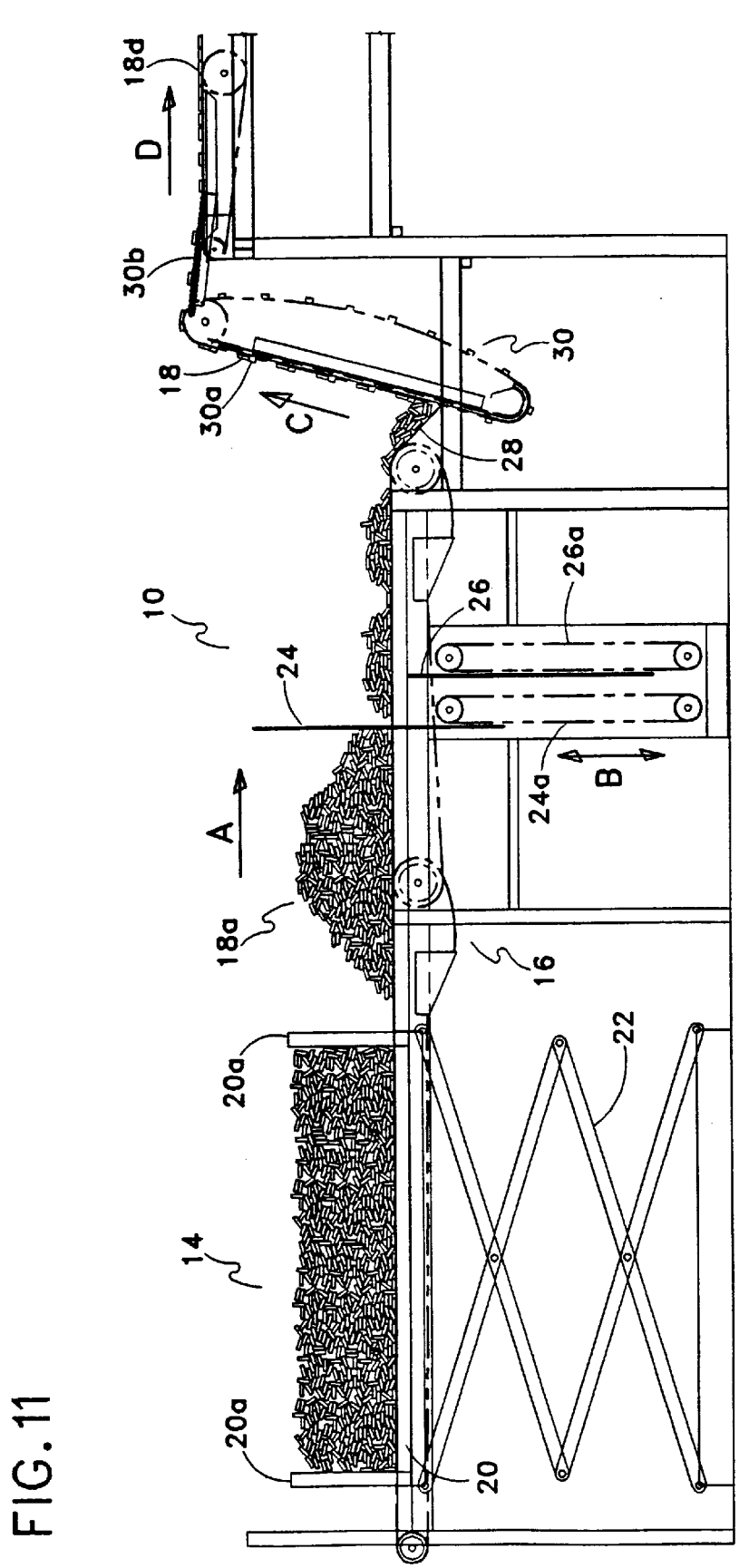
FIG. 11 is the side elevation view of FIG. 1 showing the first load of sticks being broken-down and a second load of sticks held in the stick bunk.

As seen in FIGS. 1 and 10 a pair of vertically selectively translatable stick meter gates 24 and 26 are mounted below and between conveyor chains 16a. Stick gates 24 and 26 are generally planar rigid members, for example, rectangular plates which extend and retract in direction B into and out of the stick flow path so as to meter the flow of the bunched sticks 18 on chain conveyor 16. Stick gates 24 and 26 are extended and retracted by chain drives 24a and 26a. Chain drives 24a and 26a are actuated by reversible drive motors (not shown).

After chain conveyor 16 there is an Unscrambler trough 28 located downstream of conveyor 16, at the bottom of an unscrambler 30. Unscrambler 30 has lugs 30a for lifting and separating sticks 18 from unscrambler trough 28. Unscrambler 30 transfers sticks 16 to the unscrambler outfeed 30b. Sticks 18 are translated on outfeed 30b into edge abutment with each other, edge to edge, so as to form a mat 18d for downstream allocation to the stick placer (not shown).

Advantageously, a photo-eye (not shown) is provided at trough 28 to detect the presence or absence of sticks 18. Based on the presence or absence of sticks 18 in trough 28, a controller activates or deactivates the unscrambler so as to better provide a steady supply of sticks to the allocator.

In operation, the stick metering apparatus 10 and stick conveyor 16 remain at rest as shown in FIG. 1 until a supply of sticks 18 in the unscrambler trough 28 are depleted. Once depleted, unscrambler photo-eye generates a signal to initiate a metering cycle described below as best shown in FIGS. 2 through 5. After stick bunk 20 has been fully retracted, that is, lowered, and has consequently released sticks 18 as a stick bunch 18a on top of conveyor chains 16a, rotation of endless chain conveyor 16 is initiated, translating stick bunch 18a downstream in direction A towards a first stick gate 24. First stick gate 24 is in the elevated position to interrupt the downstream translation of stick bunch 18a. Conveyor 16 runs until stick bunch 18a begins to pile up against first stick gate 24. The piling of sticks against gate 24 assists in straightening any sticks that were skewed from spilling from bunk uprights 20a onto conveyor 16. The second gate 26 is also initially raised as shown in FIG. 2. First stick gate 24 is then lowered as shown in FIG. 3. After a brief time delay, (for example, approximately 2 seconds) to allow piled up stick bunch 18a to flow against second gate 26, first gate 24 is again raised as shown in FIG. 4. Second gate 26 is then lowered, and chain conveyor 16 jogged downstream for approximately 2 seconds, (equal to approximately 2 feet of travel). This causes stick bunch 18a to translate up to, or against, first stick gate 24. Simultaneously, small stick bunch 18b is translated downstream away from first gate 24, toward unscrambler trough 28 as shown in FIG. 5.

After approximately 2 seconds, equal to approximately 2 feet of travel chain conveyor 16 is again paused, at which time gate 24 is lowered and gate 26 raised to allow the remaining stick bunch 18a to slump against gate 26 as seen in FIG. 6. Gate 24 is then raised to isolate the next small stick bunch 18c between stick gates 24 and 25 as seen in FIG. 7.

Figure 8:
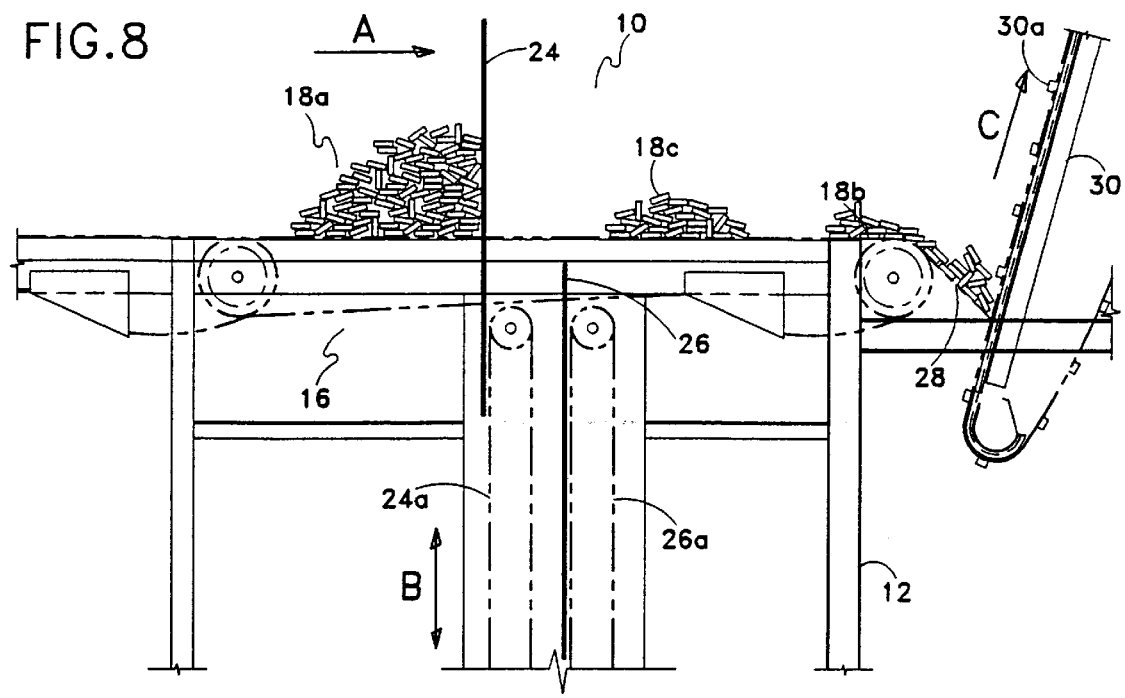
FIG. 8 is the side elevation view of FIG. 2 showing the downstream stick gate once again lowered and the segregated second portion of sticks translated downstream.
Figure 9:
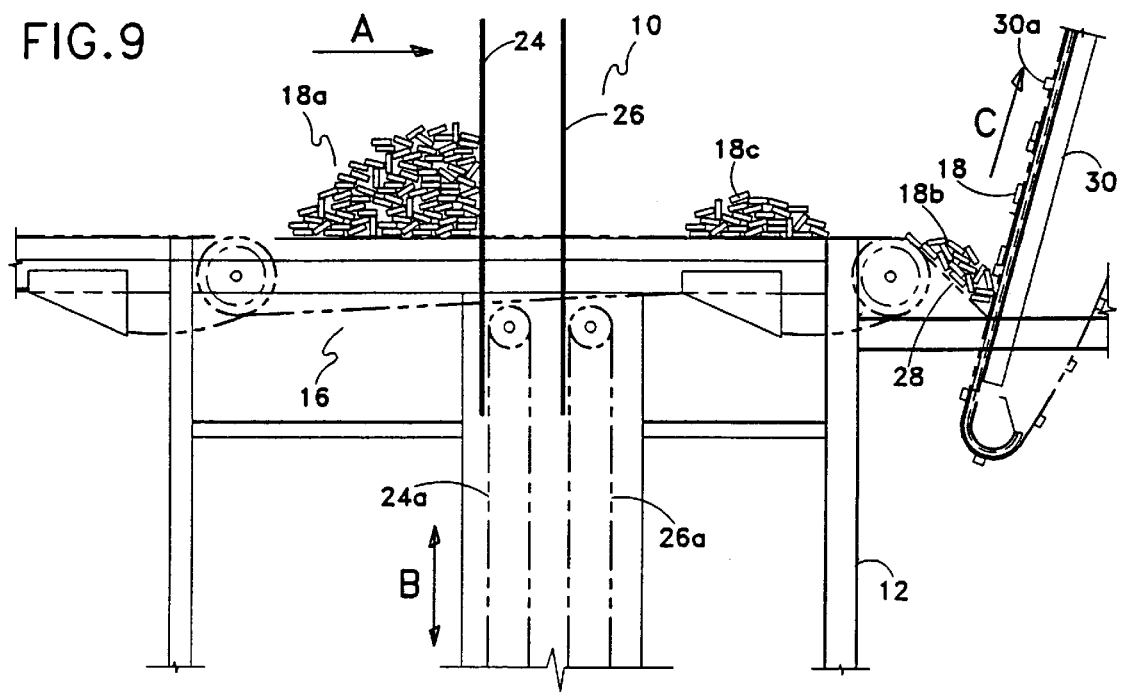
FIG. 9 is the side elevation view of FIG. 2 showing both stick gates once again elevated prior to segregating a third portion of sticks.

Stick gate 26 is then lowered, and chain conveyor 16 again jogged to advance small stick bunch 18c downstream and to advance stick bunch 18b in to unscrambler trough 28 as seen in FIG. 8. Gate 26 is once again elevated, as seen in FIG. 9, to continue the breakdown cycle for the breakdown of stick bunch 18a into smaller bunches carried into trough 28. The reader will notice the similarity in the gate positions in FIGS. 5 and 8 and readily appreciate how the alternating of elevating lowering of gates 24 and 26 allow for the segregation of small bundles of sticks from the large bunch held on conveyor 16 and for their controlled and timed sequential release from between the gates onto the conveyor that steps or jogs the small bundles towards, and into, the holding trough 28 feeding the unscrambler 30.

It has been found advantageous to conduct the breakdown cycle in periodic steps of 2 seconds per step. It is understood however that this is not intended to be limiting as depending on the speed of the unscrambler, the timing of the periodic breakdown steps may be varied to provide a timely supply of small bunches or a shallow layer of sticks to the unscrambler as sticks will tend to spread out in actual anticipated operation of the present device. Once unscrambler lugs 30a lift and separate sticks 18 from stick trough 28, the sticks move onto unscrambler outfeed 30b and form mat 18d. Mat 18d is conveyed downstream to supply the stick allocator.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A stick metering device mountable beneath a stick conveyor, said device comprising:

an upstream gate and a downstream gate, said downstream gate generally parallel to and spaced apart a first distance from said upstream gate, said upstream gate cooperating with a first actuator for independent vertical actuation of said upstream gate between an upstream elevated position and an upstream lowered position, said downstream gate cooperating with a second actuator for independent vertical actuation of said downstream gate between a downstream elevated position and a downstream lowered position, wherein when in said upstream and downstream elevated positions, respectively, said upstream and downstream gates intersect a stick flow path so as to interrupt a downstream flow of sticks along said stick flow path on said stick conveyor, and wherein when in said upstream and downstream lowered positions, respectively, said upstream and downstream gates do not intersect said stick flow path so as not to interrupt said downstream flow of sticks along said stick flow path on said stick conveyor, said upstream gate having an exposed vertical length exposed across said stick flow path when in said upstream elevated position, said exposed vertical length sufficient to dam a pile of sticks loaded onto said stick conveyor from an upstream reservoir of sticks, said first distance sufficient to allow segregation, between said upstream and downstream gates, of a portion of said pile of sticks, wherein said first and second actuators are selectively sequentially actuated by timing and actuating means for:

during a first breakdown cycle phase, elevating said upstream gate into said upstream elevated position so as to accumulate said pile of sticks against said upstream gate, during a second breakdown cycle phase, lowering said upstream gate into said upstream lowered position and elevating said downstream gate into said downstream elevated position so as to release said portion of said pile of sticks from a remainder of said pile of sticks into a segregation space between said upstream and downstream gates, during a third breakdown cycle phase, elevating said upstream gate into said upstream elevated position and lowering said downstream sate into said downstream lowered position, so as to segregate said portion of said pile of sticks from said remainder of said pile of sticks for transport downstream on said stick conveyor along said flow path, a means for coordinating selective stepped advancing of said stick conveyor in a downstream direction, so as to advance in said downstream direction said portion of said pile of sticks during said third breakdown cycle phase.

2. The device of claim 1 wherein said means for coordinating selective stepped advancing of said stick conveyor coordinates stopping of said advance of said stick conveyor in said downstream direction during said second breakdown cycle phase.

3. The device of claim 1 wherein said first and second actuators are chains and said upstream and downstream gates are mounted, respectively, to first and second actuators.

4. The device of claim 1 wherein said upstream and downstream gates are parallel rigid plates.

* * * * *